United States Patent [19]
Folsom

[11] Patent Number: 5,535,589
[45] Date of Patent: Jul. 16, 1996

[54] RATIO CONTROLLER FOR CONTINUOUSLY VARIABLE HYDROSTATIC TRANSMISSION

[75] Inventor: Lawrence R. Folsom, Pittsfield, Mass.

[73] Assignee: Martin Marietta Corporation, King of Prussia, Pa.

[21] Appl. No.: 380,268

[22] Filed: Jan. 30, 1995

[51] Int. Cl.⁶ ............................................. F16D 39/00
[52] U.S. Cl. ................................. 60/492; 91/505
[58] Field of Search ....................... 60/487, 490, 491, 60/492; 91/505, 507; 92/12.2, 57, 71; 417/269

[56] References Cited

U.S. PATENT DOCUMENTS

| | | | |
|---|---|---|---|
| 1,648,000 | 11/1927 | Lee. | |
| 2,788,636 | 4/1957 | Badalini | 60/492 |
| 2,832,198 | 4/1958 | Pichon | 60/53 |
| 3,175,363 | 3/1965 | Molly | 60/53 |
| 3,204,411 | 9/1965 | Stockton | 60/492 |
| 3,291,068 | 12/1966 | Wiggermann | 103/162 |
| 3,522,704 | 8/1970 | Martin | 60/492 X |
| 3,601,981 | 8/1971 | Ifield | 60/19 |
| 3,602,105 | 8/1971 | Slusher | 91/483 |
| 3,650,107 | 3/1972 | Court | 60/490 X |
| 3,654,761 | 4/1972 | Eickmann | 60/53 |
| 3,740,954 | 6/1973 | Young | 60/489 |
| 4,458,486 | 7/1984 | Baker | 60/490 X |
| 4,493,189 | 1/1985 | Slater | 60/489 |
| 4,495,768 | 1/1985 | Valavaara | 60/414 |
| 4,815,327 | 3/1989 | Drevet | 417/269 X |
| 4,901,529 | 2/1990 | Iino | 60/489 |
| 5,269,142 | 12/1993 | Atake | 60/487 X |
| 5,423,183 | 6/1995 | Folsom | 60/492 |

*Primary Examiner*—Hoang Nguyen
*Attorney, Agent, or Firm*—Robert A. Cahill; Geoffrey H. Krauss

[57] ABSTRACT

A continuously variable hydrostatic transmission includes an input shaft connected to drive a hydraulic pump unit, a grounded hydraulic motor unit, and an output shaft. A wedge-shaped swashplate is pivotally mounted to the output shaft in driving connection to receive output torque resulting from the exchange of pressurized hydraulic fluid between the pump and motor units through slots in the swashplate. A hydraulically actuated ratio controller shifts the axial positions of spherical bearings mounting a pump portplate in the hydraulic pump unit and a motor portplate in the hydraulic motor unit to adjust the swashplate angle relative to the output shaft axis and thereby change transmission ratio.

16 Claims, 1 Drawing Sheet

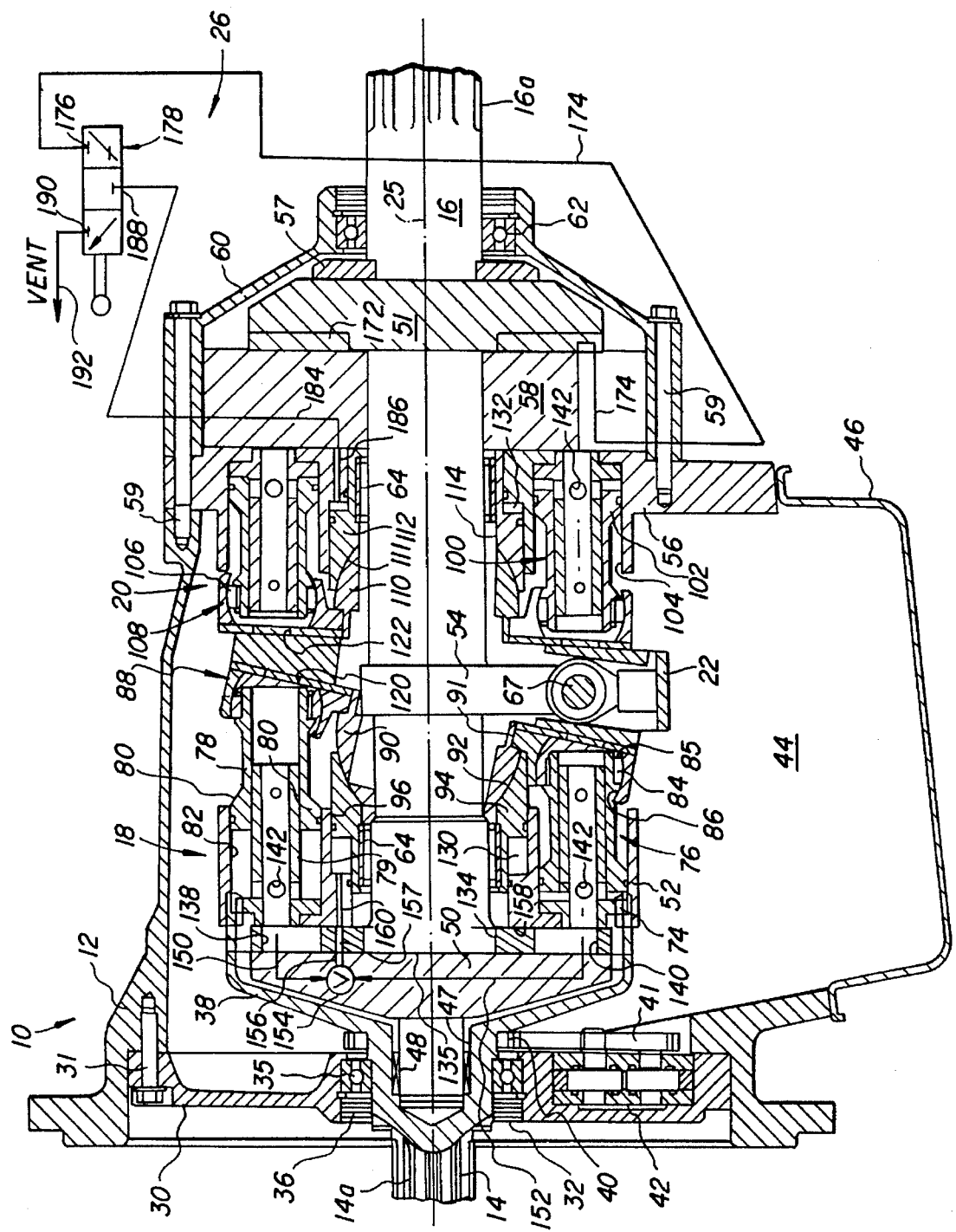

RATIO CONTROLLER FOR CONTINUOUSLY VARIABLE HYDROSTATIC TRANSMISSION

REFERENCE TO RELATED APPLICATIONS

The invention disclosed in this application has particular, but not necessarily limited application to the continuously variable hydrostatic transmissions disclosed in copending U.S. patent application Ser. Nos. 08/093,192 filed Jul. 13, 1993, now U.S. Pat. No. 5,423,183, issued Jun. 13, 1995; and allowed copending application Ser. Nos. 08/342,472, filed Nov. 21, 1994. The disclosures of these applications are incorporated herein by reference.

FIELD OF THE INVENTION

The present invention relates to hydraulic machines and, more particularly, to hydrostatic transmissions capable of transmitting power from a prime mover to a load at continuously (infinitely) variable transmission ratios.

BACKGROUND OF THE INVENTION

In the cited applications, a hydraulic machine is disclosed as including a hydraulic pump unit and a hydraulic motor unit positioned in opposed, axially aligned relation with an intermediate, wedge-shaped swashplate. The pump unit is connected to an input shaft driven by a prime mover, while the motor unit is grounded to the stationary machine housing. An output shaft, coaxial with the input shaft and drivingly coupled to a load, is connected to the swashplate. When the pump unit is driven by the prime mover, hydraulic fluid is pumped back and forth between the pump and motor units through ports in the swashplate. As a result, three torque components, all acting in the same direction, are exerted on the swashplate to produce output torque on the output shaft for driving the load. Two of these torque components are a mechanical component exerted on the swashplate by the rotating pump unit and a hydromechanical component exerted on the swashplate by the motor unit. The third component is a pure hydrostatic component resulting from the differential forces created by the fluid pressures acting on circumferentially opposed end surfaces of the swashplate ports, which are of different surface areas due to the wedge shape of the swashplate.

To change transmission ratio, the angular orientation of the swashplate relative to the axis of the output shaft is varied. Since the transmission ratio, i.e., speed ratio, is continuously variable between a reverse range and an overdrive range through a normal forward range from 1:0 to 1:1 ratios. The prime mover can run at a constant speed set essentially at its most efficient operating point. The availability of a 1:0 (neutral) transmission ratio setting eliminates the need for a clutch, and the availability of a reverse range eliminates the need for a reversing gear set. Unlike conventional, continuously variable hydrostatic transmissions, wherein hydraulic fluid flow rate increases proportionately with increasing transmission ratio such that maximum flow rate occurs at the highest transmission ratio setting, the flow rate in the hydraulic machine disclosed in my cited patent applications reaches a maximum at a midpoint in the ratio range and then progressively decreases to essentially zero at the (1:1) transmission ratio setting. Thus, losses due to hydraulic fluid flow are reduced, and the annoying whine of conventional hydrostatic transmissions at high ratios is avoided. By virtue of the multiple torque components exerted on the swashplate, the decreasing hydraulic fluid flow in the upper half of the output speed range, and the capability of accommodating an optimum performance prime mover input, the hydraulic machine of my cited patent applications has a particularly advantageous application as a highly efficient, quiet, continuously variable hydrostatic transmission in vehicular drive trains.

SUMMARY OF THE INVENTION

An objective of the present invention is to provide improvements in the hydraulic machines of U.S. application Ser. Nos. 08/093,192 and 08/342,472, to achieve economies in size, parts count and manufacturing cost.

A further objective of the present invention is to provide improvements in the provisions for changing transmission ratio, i.e., adjustment of swashplate angle.

To achieve these objectives, the hydraulic machine of the present invention, in its application as a continuously variable hydrostatic transmission, provides a continuously variable hydrostatic transmission comprising, in combination: a housing; an input shaft journaled in the housing to receive torque from a prime mover; a pump unit including a first carrier driven by the input shaft and mounting an annular array of pump pistons and pump cylinders, a first annular portplate, and a first spherical bearing mounting the first portplate to the first carrier for precessing motion; a motor unit including a second carrier fixed to the housing and mounting an annular array of motor pistons and motor cylinders, a second portplate, and a second spherical bearing mounting the second portplate to the second carrier for precessing motion; an output shaft journaled in the housing and adapted for driving connection to a load; an annular swashplate surrounding the output shaft and having an input face and an output face arranged at an acute angle relative to each other, with the input face in interfacial contact with the first portplate and the output face in interfacial contact with the second portplate, the swashplate further including slots accommodating pumped fluid flow between the pump cylinders and the motor cylinders through ports in the first and second port plates; a connector pivotally coupling the swashplate to the output shaft in torque-coupled relation; and a ratio controller selectively exerting coordinated forces on the first and second spherical bearings to produce precessing motion of the first and second port plates, whereby to adjustably set an angle of the swashplate relative to an axis of the output shaft according to a desired speed ratio between the input and output shafts.

Additional features, advantages, and objectives of the invention will be set forth in the description which follows and in part will be apparent from the description, or may be learned by practice of the invention. The objectives and advantages of the present invention will be realized and attained by the apparatus particularly pointed out in the following written description and the appended claims, as well as in the accompanying drawings.

It will be understood that both the foregoing general description and the following detailed description are exemplary and explanatory and are intended to provide further explanation of the invention as claimed.

The accompanying drawing is intended to provide a further understanding of the invention and is incorporated in and constitute a part of the specification, illustrates a preferred embodiment of the invention and, together with the description, serves to explain the principles of the invention.

BRIEF DESCRIPTION OF THE DRAWING

The sole figure of the drawing is a longitudinal sectional view of a continuously variable hydrostatic transmission embodying the present invention.

DETAILED DESCRIPTION OF THE PREFERRED EMBODIMENT

The continuously variable hydrostatic transmission according to the presently preferred embodiment of the present invention, generally indicated at 10, comprises, as basic components, a housing 12 in which are journaled an input shaft 14 and an output shaft 16 in coaxial, generally end-to-end relation. The end of input shaft 14 external to the housing is splined, as indicated at 14a, to facilitate driving connection to a prime mover (not shown), while the outer end of output shaft 16 is splined, as indicated at 16a, to facilitate driving connection to a load (not shown). Input shaft 14 drives a hydraulic pump unit, generally indicated at 18. A hydraulic motor unit, generally indicated at 20, is grounded to housing 12 in axially opposed relation to pump unit 18. A wedge-shaped swashplate, generally indicated at 22, is drivingly connected to the output shaft 16 in a position between the pump and motor units and is ported to provide for the exchange of hydraulic fluid between the pump and motor units. A controller, generally indicated at 26, acts to pivotally adjust the angle of swashplate orientation relative to the output shaft axis 25, thereby setting the transmission ratio of the input shaft speed to the output shaft speed.

Now referring to the sole FIGURE in greater detail, the cylindrical housing 12 includes a cover 30 secured in place by an annular array of bolts, one seen at 31, to close off the open input end of the housing. Input shaft 14 extends into housing 12 through a central opening 32 in the cover. Bearings 35, fitted in cover opening 32 journal the input shaft 14 for rotation. Seals 36 are included in the cover opening 32 in sealing relation with the input shaft peripheral surface to prevent leakage of hydraulic fluid.

The inner termination of input shaft 14 is radially flared to provide a bell mouth-shaped inner termination 38. Just to the left of shaft termination 38, input shaft 14 carries a spur gear 40, which meshes with a gear 41 connected to drive a sump pump 42 operating to draw makeup hydraulic fluid from a sump 44 provided by a lower pan 46 affixed to housing 12. The inner end of input shaft 14 is counterbored to provide a cylindrical recess 47 for receiving a reduced diameter inner terminal portion of output shaft 16. Bearings 48, fitted in recess 47, provide inner end journal support for the output shaft.

Assembled on output shaft 16 between an inner endpiece 50 and an outer endpiece 51 are an annular pump unit carrier 52, a swashplate coupling arm 54, an annular motor piston carrier 56, and an annular manifold block 58. This assembly is held together by a C-clip 57 captured in an output shaft groove in backing relation with endpiece 51. The motor piston carrier and manifold block are grounded to housing 12 by bolts 59, which also secure an output end cover 60 to the housing 12. A ring bearing 62, fitted in the central opening of cover 60, provides output end journal support for the output shaft. Bearings 64 positioned between the output shaft 16 and pump unit carrier 52 and between the output shaft and the motor unit carrier 56 provide journal support for these carriers as the output shaft rotates relative thereto. Radial swashplate coupling arm 54 is keyed to the output shaft and is provided with a transverse hole in which a pin 67 is received to pivotally and drivingly connect the swashplate 22 to the output shaft 16. The axis of pin 67 is oriented in orthogonal relation to the output shaft axis 25.

The input shaft termination 38 and pump unit carrier 52 are machined with gear teeth which intermesh, as indicated at 74, and thus the pump unit carrier 52 is drivingly coupled to input shaft 14. The pump carrier supports a plurality of piston-cylinder pairs included in hydraulic pump unit 18. These piston-cylinder pairs, for example, ten in number with two being generally indicated at 76, are uniformly distributed in a circular array concentric with output shaft axis 25 in the manner disclosed in the cited application Ser. No. 08/093,192. As illustrated herein, each pump piston-cylinder pair 76 includes a piston 78 telescopically mounted by an axially extending cylindrical post 79 affixed to the pump unit carrier 52. The left end of each piston 78 is radially flared to provide a piston head 80 that reciprocates in a separate cylinder 82 provided in pump unit carrier 52. The right or foot end of each piston 78 is shouldered to receive an annular, spherical bushing 84 that is axially fixed to the piston by a clip 85, while permitting limited radial motion of the bushing. The spherical outer surface of bushing 84 bears against a spherical inner surface 86 Of an annular portplate, generally indicated at 88. An annular spherical bearing 90 affixed in the central opening 91 of portplate 88. This spherical bearing is, in turn, supported by the conforming spherical surface 92 of an annular bearing support block 94 that is Slidingly received in a cylindrical recess 96 machined in the central opening of pump unit carrier 52. By virtue of the spherical bearing mountings of portplate 88, precessing motion of the axis of rotation of this portplate is accommodated.

Hydraulic motor unit 20 is constructed in essentially the same manner as hydraulic pump unit 18. However, as noted above, annular motor unit carrier 56, corresponding to pump unit carrier 52, is grounded to housing 12 by bolts 59. Each of a plurality of motor pistons, generally indicated at 100 and corresponding in number to the pump pistons 78, includes a piston head 102 reciprocating in a cylinder 104 and a piston foot that carries a spherical bushing 106 engaging the spherical bearing surface of an annular motor unit portplate 108. An annular spherical bearing 110 is affixed in the central opening of portplate 108 to engage the spherical surface 111 of an annular bearing support block 112 slidingly received in a cylindrical recess 114 machined in the central opening of motor unit carrier 56. Since motor unit 20 is grounded to the housing 12, the motor unit carrier and portplate 108 do not rotate, however, the spherical bearing mountings of this portplate accommodate precessing motion of the portplate axis.

Swashplate 22 is drivingly connected to output shaft 16 by coupling arm 54 in operative position between pump unit 18 and motor unit 20, with an input face in intimate sliding contact with the face of pump unit portplate 88 and an output face in intimate sliding contact with the face of motor unit portplate 108. The input and output faces of swashplate 22 are relatively oriented at an acute angle to provide the wedge shape of the swashplate. Ports (not shown), extend between the input and output faces of the swashplate to provide fluid communication between pump unit cylinders 82 and motor unit cylinders 104 through radial holes 142 in the cylindrical pump and motor piston mounting posts and through openings 120 in pump unit portplate 88 and openings 122 in motor unit portplate 108, all as more fully described in cited application Ser. No. 08/093,192.

As fully described in my applications cited above, transmission ratio (input shaft speed verses output shaft speed) is changed by adjusting the angular orientation of swashplate 22 relative to the output shaft axis 25. When the input face of the swashplate is perpendicular to the output shaft axis, the axis of pump unit portplate 88 is coincident with the output shaft axis. Consequently, driven rotation of the pump unit carrier does not produce reciprocation of pump pistons 78, and therefore no pumping action of hydraulic fluid by pump unit 18 occurs. This is the neutral setting (1:0) of transmission 10. Further counterclockwise pivoting of the swashplate beyond the 1:0 neutral setting provides a limited reverse range of continuously variable transmission ratios, wherein output shaft 16 is driven in the opposite direction to the input shaft rotation.

When the swashplate is pivoted on pin 67 in the clockwise direction from the neutral setting, the axis of the rotating pump unit portplate is precessed at an angle relative to the output shaft axis. The consequent nutating motion of the pump unit portplate causes the pump pistons 76, swivel-connected thereto, to reciprocate in their pump cylinders 82 to pump hydraulic fluid; the pump piston strokes being determined by the precessed angle position of pump unit port plate 88. Continued clockwise pivoting of the swashplate increases the precessed angle of portplate 88 and, consequently, the pumping action of the pump unit is increased. Transmission ratio is thus increased. When the output face of the swashplate 22 is perpendicular to the output shaft axis 25, the axis of the motor unit portplate 108 is precessed into coincidence with the output shaft axis. Consequently there is no hydraulic fluid pumping action of motor unit pistons 100. The pump unit 18 and swashplate 22 are then essentially locked up hydraulically with no relative rotational movement between pump unit portplate 88 and the swashplate 22. This is the 1:1 ratio setting of transmission 10. Further clockwise pivoting of the swashplate provides a limited overdrive range of continuously variable transmission ratios, in which the output shaft is driven in the same direction as the input shaft, but at a greater speed.

In accordance with a feature of the present invention, ratio-changing of the swashplate angle relative to the output shaft axis 25 is achieved by exerting coordinated forces on the pump unit portplate 88 and motor unit portplate 108 induced by shifting the axial positions of support blocks 94 and 112 that mount the pump unit portplate 88 and motor unit portplate 108 via spherical bearings 90 and 110, respectively. To this end, pump unit carrier 52 and bearing support block 94 are provided with axially opposed shoulders which, in conjunction with radially opposed skirt portions of the pump unit carrier and bearing support block, define an annular chamber 130. Similarly, axially opposed shoulders and radially opposed skirts formed in the motor unit carrier 56 and bearing support block 112 define an annular chamber 132.

For the illustrated swashplate angle, it is seen that the volume of chamber 130 is axially expanded, while the volume of chamber 132 is axially contracted. Consequently, spherical bearings 90 and 110 have been jointly shifted to rightward axial positions, as are the pump unit 88 and motor unit 108 portplates carried by these spherical bearings. As the pump and motor unit portplates are axially shifted leftward, swashplate 22 is forcibly pivoted in the counterclockwise direction about pivot pin 67. This is achieved by axially expanding the volume of chamber 132, as the volume of chamber 130 is axially contracted.

To establish fluid pressure in chamber 130, an annular input portplate 134 is fixed against the radial face 135 of inner endpiece 50 of output shaft 16. Thus, the output shaft and input portplate 134 rotate in unison. As described in detail in cited U.S. patent application Ser. No. 08/342,472, input portplate 134 is provided with a pair of circumferentially elongated, kidney-shaped ports in diametrically opposed relation illustrated at 138 and 140 herein. The radial holes 142 in cylindrical pump piston mounting posts 79 provide fluid flow communication between the pump cylinders 82 and ports 138 and 140 in input portplate 134. Thus, hydraulic fluid from the pump cylinders flows to fill ports 138 and 140 in the input portplate 134. The hydraulic fluid in these ports 138 and 140 is thus pressurized according to the fluid pressures in the pump cylinders 82 as pump unit 18 is driven by input shaft 14. When the pump pistons 78 and pump cylinders 82 revolve from the thinnest point of the wedge-shaped swashplate 22 around to its diametrically opposed thickest point, the volumes of the associated pump cylinders progressively decrease, and the hydraulic fluid in these pump cylinders is therefore being pressurized. This is considered to be the high pressure or pumping side of hydraulic pump unit 18.

When, the pump pistons and pump cylinders revolve from the thickest point around to the thinnest point of the swashplate 22, the volumes of the associated pump cylinders 82 are progressively expanded. This is considered to be the low pressure or suction side of the hydraulic pump unit 18. Since ports 138 and 140 are in fluid communication with the hydraulic fluid in pump cylinders 82, the hydraulic fluid in one of these ports is pressurized to a high pressure essentially corresponding to the average fluid pressures of the hydraulic fluid in the pump cylinders involved in the pumping side, and the hydraulic fluid in the other of these ports assumes the average fluid pressure of the hydraulic fluid in the pump cylinders involved in the suction or low pressure side of hydraulic pump unit 18.

Again as detailed in application Ser. No. 08/342,472, fluid passages, schematically illustrated at 150 and 152 herein, are drilled in the annular endpiece 50 of output shaft 16. Passage 150 extends from input portplate port 138 to a shuttle valve 154, while passage 152 extends from port 140 to valve 154. An axial passage 156 in endpiece 50 and an aligned axial hole 157 through input portplate 134 provide fluid communication between an annular cavity 158 in input portplate 134 and shuttle valve 154. An axial passage 160 in pump unit carrier 52 places annular cavity 158 in continuous fluid communication with chamber 130.

In operation, shuttle valve 154 ensures that only the low pressure side of the hydraulic pump unit is in continuous flow communication with chamber 130 via the low fluid pressure port 138, passage 150, holes 156, 157, and passage 160. It will be noted that annular cavity 158 ensures continuous flow communication between portplate hole 157 and pump unit carrier passage 160 regardless of their relative angular positions.

Now considering the output end of transmission 10, as previously noted, annular manifold block 58 surrounds output shaft 16 in an axial position between motor unit carrier 56 and endpiece 51 of the output shaft. The radial face of endpiece 51 is recessed to receive an annular output portplate 172, which is locked in place. Thus, output portplate 172 rotates with output shaft 16 while, as noted above, manifold block 58 is stationary, being grounded to housing 12 by bolts 59.

Manifold block 58 and output portplate 172 are preferably of the construction described in U.S. application Ser. No. 08/342,472, to provide fluid passages and a port, respectively, commonly shown in schematic as fluid line 174, which are included in a hydraulic circuit path leading from motor cylinders 104 in the high pressure side of hydraulic motor unit 20 to a right port 176 of a ratio control valve, generally indicated at 178. Further passages in the manifold block 58 are included in a hydraulic circuit path (schematically indicated at 184) leading from chamber 132 and an axial passage 186 in motor unit carrier 56 to a center port 188 of control valve 178. The left port 190 of the control valve is connected to a vent line 192 leading to sump 44.

In operation, to hold a desired transmission ratio (swashplate angle) control valve 178 is in the closed center position. Chamber 132 is then sealed off, and the fluid pressures in the two chambers 130 and 132 equalize to fix the axial positions of the support blocks 94 and 112 and precessed positions of spherical bearings 90 and 110. Consequently, the swashplate is maintained to set the transmission ratio. Note that the axial hydraulic forces on the spherical bearing support blocks are in opposite directions to appropriately press the faces of the pump unit portplate 88 and the motor unit portplate 108 against the input and output faces of swashplate 22.

When it is desired to decrease transmission ratio (pivot swashplate 22 in the counterclockwise direction), control valve 178 is shifted leftward to place chamber 132 in fluid flow communication with the high pressure side of the motor unit 20 via hydraulic circuit paths 174 and 184. The fluid pressure in chamber 132 quickly exceeds the fluid pressure in chamber 130, and the volume of chamber 132 expands, as the volume of chamber 130 contracts. The spherical bearings 90 and 110 are thus shifted leftward by their respective support blocks 92 and 114 to pivot swashplate 22 in the counterclockwise direction. When the desired swashplate angle is achieved (lower transmission ratio), control valve 178 is repositioned to the closed center position, and a balance in the fluid pressures in chambers 130 and 132 is reestablished to hold the leftward shifted spherical bearing axial positions and thus set the swashplate angle for a lower transmission ratio.

When it is desired to increase transmission ratio (pivot swashplate in the clockwise direction), the control valve 178 is shifted rightward to vent chamber 132 to the atmospheric pressure of sump 44 via fluid line 192. As a result, the fluid pressure in chamber 130 exceeds the fluid pressure in chamber 132. The volume of chamber 130 expands, as the volume of chamber 132 contracts, and the spherical bearings are axially shifted rightward to pivot swashplate 22 in the clockwise direction. Again, when the desired higher transmission ratio is achieved, control valve is repositioned to the closed center position, thereby reestablishing a fluid pressure balance in chambers 130 and 132 to hold the swashplate angle to the higher transmission ratio.

From the foregoing description, it is seen that the present invention provides an infinitely variable hydrostatic transmission of the type disclosed in the cited applications that affords advantages of compact size, fewer parts and reduced manufacturing costs. Involving the spherical bearings in the ratio controller design provides a highly efficient and effective approach to changing swashplate angle.

It will be apparent to those skilled in the art that various modifications and variations can be made to the apparatus of the present invention without departing from the spirit of the invention. Thus it is intended that the present invention cover modifications and variations thereof, provided they come within the spirit of the appended claims and their equivalence.

What is claimed is:

1. A continuously variable hydrostatic transmission comprising, in combination:

a housing;

an input shaft journaled in the housing to receive torque from a prime mover;

a pump unit including a first carrier driven by the input shaft and mounting an annular array of pump pistons and pump cylinders, an annular portplate, and a first spherical bearing mounting the first portplate to the first carrier for precessing motion;

a motor unit including a second carrier fixed to the housing and mounting an annular array of motor pistons and motor cylinders, a second portplate, and a second spherical bearing mounting the second portplate to the second carrier for precessing motion;

an output shaft journaled in the housing and adapted for driving connection to a load;

an annular swashplate surrounding the output shaft and having an input face and an output face arranged at an acute angle relative to each other, the input face confronting the first portplate and the output face confronting the second portplate, the swashplate further including slots accommodating pumped fluid flow between the pump cylinders and the motor cylinders through ports in the first and second portplates;

a connector pivotally coupling the swashplate to the output shaft in torque-coupled relation; and a ratio controller selectively exerting coordinated axial forces on the first and second spherical bearings to produce precessing motion of the first and second portplates, so as to adjustably set an angle of the swashplate relative to an axis of the output shaft according to a desired speed ratio between the input and output shafts.

2. The transmission defined in claim 1, wherein the ratio controller includes a fluid circuit for exerting hydraulic forces to adjustably set axial positions of the first and second spherical bearings relative to the output shaft and thereby establish precessed positions of the first and second portplates.

3. The transmission defined in claim 1, wherein the connector includes a radial arm having an inner end fixed to the output shaft and having a free end pivotally connected to the swashplate.

4. The transmission defined in claim 3, wherein the connector further includes a pin oriented transversely to the output shaft axis and pivotally interconnecting the arm free end and the swashplate.

5. The transmission defined in claim 2, wherein the first spherical bearing is fixed to the first portplate, and the second spherical bearing is fixed to the second portplate, the transmission further including:

a first support block slidingly mounted by the first carrier for axial motion and having an annular spherical bearing surface engaging the first spherical bearing;

a second support block slidingly mounted by the second carrier for axial motion and having an annular spherical surface engaging the second spherical bearing, the ratio controller operating to induce coordinated axial motions of the first and second support blocks to adjustably establish the precessed positions of the first and second portplates, the precessed portplate positions setting the swashplate angle relative to the output shaft axis.

6. The transmission defined in the claim 5, wherein the first carrier and the first support block are configured to define a first chamber, the second carrier and second support block are configured to define a second chamber, and the ratio controller operates to create fluid pressure differentials in the first and second chambers, thereby producing the coordinated axial motions of the first and second support blocks.

7. The transmission defined in claim 6, wherein the ratio controller includes:
   a first fluid circuit continuously connecting the first chamber to a low pressure side of the pump unit for maintaining the fluid pressure in the first chamber at a control fluid pressure;
   a second fluid circuit communicating with a high pressure side of the motor unit;
   a third fluid circuit connected with the second chamber; and
   a control valve selectively operable to:
      close the third fluid circuit to create a fluid pressure in the second chamber balancing the control fluid pressure in the first chamber and thereby maintain the axial positions of the first and second support blocks,
      connect the third fluid circuit to the second fluid circuit, for creating a fluid pressure in the second chamber greater than the control fluid pressure in the first chamber and thereby expand the volume of the second chamber, while contracting the volume of the first chamber, to jointly shift the axial positions of the first and second support blocks in a first axial direction, and
      vent the third fluid circuit to a low pressure less than the control pressure, for creating a fluid pressure in the second chamber less than the control pressure in the first chamber, thereby contracting the volume of the second chamber, while expanding the volume of the first chamber, to jointly shift the axial positions of the first and second support blocks in a second axial direction opposite to the first axial direction.

8. The transmission defined in claim 5, wherein the pistons of the pump unit are swivel-connected to the first portplate, and the pistons of the motor unit are swivel-connected to the second portplate.

9. The transmission defined in claim 8, wherein the pump unit further includes first cylindrical posts telescopically mounting the pump unit pistons for axially reciprocating motion of a stroke determined by the precessed position of the first portplate, and the motor unit further includes second cylindrical posts telescopically mounting the motor unit pistons for axial reciprocating motion of a stroke determined by the precessed position of the second portplate.

10. The transmission defined in claim 9, wherein the first cylindrical posts have radial openings placing the pump unit cylinders in fluid communication with the ports of the first portplate, and the second cylindrical posts have radial openings placing the motor unit cylinders in fluid communication with the ports of the second portplate.

11. A continuously variable hydrostatic transmission comprising, in combination:
   a housing;
   an input shaft journaled in the housing to receive torque from a prime mover;
   a pump unit including a first carrier driven by the input shaft and mounting an annular array of pump pistons and pump cylinders, a first annular support block adjustable in axial position and having a spherical bearing surface, a first portplate, and an annular spherical bearing affixed to the first portplate and engaging the first support block spherical bearing surface;
   a motor unit including a second carrier fixed to the housing and mounting an annular array of motor piston and motor cylinders, a second annular support block adjustable in axial position and having a spherical bearing surface, a second portplate, and a second annular spherical bearing affixed to the second portplate and engaging the second support block spherical bearing surface;
   an output shaft journaled in the housing and adapted for driving connection to a load;
   an annular swashplate surrounding the output shaft and having an input face and an output face arranged at an acute angle relative to each other, the input face in interfacial engagement with the first portplate and the output face in interfacial engagement with the second portplate, the swashplate further including slots accommodating pumped fluid flow between the pump cylinders and the motor cylinders through ports in the first and second portplates;
   a connector pivotally coupling the swashplate to the output shaft in torque-coupled relation;
   a ratio controller selectively exerting coordinated, hydraulic forces to adjustably shift the axial positions of the first and second support blocks, thereby producing precessing motions of the first and second portplates effective to adjust an angular orientation of the swashplate relative to the axis of the output shaft.

12. The transmission defined in the claim 11, wherein the first carrier and the first support block are configured to define a first chamber, the second carrier and second support block are configured to define a second chamber, and the ratio controller is connected to create fluid pressure differentials in the first and second chambers, thereby producing the coordinated axial motions of the first and second support blocks.

13. The transmission defined in claim 12, wherein the ratio controller includes:
   a first fluid circuit continuously connecting the first chamber to a low pressure side of the pump unit for maintaining the fluid pressure in the first chamber at a control fluid pressure;
   a second fluid circuit communicating with a high pressure side of the motor unit;
   a third fluid circuit connected with the second chamber; and
   a control valve selectively operable to:
      close the third fluid circuit to create a fluid pressure in the second chamber balancing the control fluid pressure in the first chamber and thereby maintain the axial positions of the first and second support blocks,
      connect the third fluid circuit to the second fluid circuit, for creating a fluid pressure in the second chamber greater than the control fluid pressure in the first chamber and thereby expand the volume of the second chamber, while contracting the volume of the first chamber, to jointly shift the axial positions of the first and second support blocks in a first axial direction, and
      vent the third fluid circuit to a low pressure less than the control pressure, for creating a fluid pressure in the second chamber less than the control pressure in the first chamber, thereby contracting the volume of the second chamber, while expanding the volume of the first chamber, to jointly shift the axial positions of the first and second blocks in a second axial direction opposite to the first axial direction.

14. The transmission defined in claim 13, wherein the pistons of the pump unit are swivel-connected to the first portplate, and the pistons of the motor unit are swivel-connected to the second portplate.

15. The transmission defined in claim 14, wherein the pump unit further includes first cylindrical posts telescopically mounting the pump unit pistons for axially reciprocating motion of a stroke determined by the precessed position of the first portplate, and the motor unit further includes second cylindrical posts telescopically mounting the motor unit pistons for axial reciprocating motion of a stroke determined by the precessed position of the second portplate.

16. The transmission defined in claim 15, wherein the first cylindrical posts have radial openings placing the pump unit cylinders in fluid communication with the ports of the first portplate, and the second cylindrical posts have radial openings placing the motor unit cylinders in fluid communication with the ports of the second portplate.

* * * * *